United States Patent [19]
Ehlscheid et al.

[11] 3,965,327
[45] June 22, 1976

[54] METHOD OF CUTTING MATERIAL TO SHAPE FROM A MOVING WEB BY BURNING

[75] Inventors: Günter Ehlscheid, Neuwied; Peter Langenbeck, Frickingen; Kurt Stemmler, Neuwied, all of Germany

[73] Assignee: Winkler & Dunnebier Maschinenfabrik und Eisengiesserei KG, Neuwied (Rhine), Germany

[22] Filed: Oct. 8, 1974

[21] Appl. No.: 513,022

[30] Foreign Application Priority Data
Oct. 10, 1973  Germany.............................. 2350933

[52] U.S. Cl. ......................................... 219/121 LM
[51] Int. Cl.² ........................................ B23K 26/00
[58] Field of Search ................. 219/121 L, 121 LM; 331/94.5 R; 350/6, 288, 289, 299

[56] References Cited
UNITED STATES PATENTS

| | | |
|---|---|---|
| 3,612,814 | 10/1971 | Houldcroft...................... 219/121 L |
| 3,622,740 | 11/1971 | Rauussin et al................. 219/121 L |
| 3,761,675 | 9/1973 | Mason et al. ................. 219/121 LM |
| 3,848,104 | 11/1974 | Locke ............................ 219/121 L |

*Primary Examiner*—E. A. Golberg
*Assistant Examiner*—G. R. Peterson
*Attorney, Agent, or Firm*—Sughrue, Rothwell, Mion, Zinn & Macpeak

[57] ABSTRACT

A method and apparatus for cutting a predetermined pattern in a moving web of material, such as paper, cardboard or the like is disclosed wherein a laser beam is deflected by a series of pivotable mirrors. The pivoting of the mirrors is controlled so as to cause the laser beam to trace and cut a predetermined pattern. The laser beam moves only in rectilinear motion, as does the web of material to be cut. Since the directions of motions are not parallel, any pattern may be cut by controlling the relative speeds of the laser beam and the moving web of material.

8 Claims, 2 Drawing Figures

METHOD OF CUTTING MATERIAL TO SHAPE FROM A MOVING WEB BY BURNING

BACKGROUND OF THE INVENTION

1. Field of the Invention

This invention relates to a method and apparatus for cutting material to shape from a moving web or part of a moving web of paper, cardboard or the like, by burning by means of a laser beam.

2. Description of Prior Art

Paper, cardboard or the like is usually cut to shape by a knife or a set of knives, which require a cutting mechanism to hold and guide them during the cutting movement. The necessary mechanical cutting mechanism and knives or sets of knives are subject to wear, are relatively complicated and expensive, and allow only a limited cutting speed and only a limited cutting frequency in periodic operation.

To obviate the disadvantages of the mechanical knives, it is known to make a cut by means of a focussed point of a laser beam.

SUMMARY OF THE INVENTION

The object of the invention is to provide a method and apparatus for cutting a moving web of paper, cardboard or the like material to shape by burning with a laser beam, whereby a two-dimensional shaped cut is possible with the minimum outlay of components and control members.

To this end, the method according to the invention is characterized in that in order to produce a two-dimensional cut, the laser beam is deflected at a controlled speed at its cutting point one-dimensionally on one or more straight cutting paths which extend at an angle or transversely to the direction of movement of the material.

With the method according to the invention, a two-dimensional shaped cut is accomplished by guiding the laser beam along at least one straight cutting path while the material to be cut is moved beneath said cutting path. The speed at which the laser beam is guided along the straight cutting path is controlled according to the required cut. The speed may be varied during a single pass through the cutting path. The simultaneous movement of the material beneath the cutting path and of the laser beam along the cutting path, which extends at an angle or transversely to the direction of movement of the material, enables a two-dimensional cutting curve or a two-dimensional shaped cut to be produced although the material and the laser beam each perform only a rectilinear, i.e. one-dimensional, movement. This is one of the main advantages of the method according to the invention, since the fact that the laser beam undergoes only rectilinear motion means that a simple beam deflection control is sufficient. The angle of the cutting path with respect to the direction of movement of the material depends on the speed of the material, the maximum speed of the laser beam in the cutting path and the shape of the required cut.

When the required cut is to start at the edge of the material and terminate at the same edge, for example, in the case of blanks for envelopes and bags, the laser beam must be guided into and out of the material again. To this end, in an advantageous development of the method according to the invention, the laser beam is guided along the same cutting path in both directions thereof.

However, the required cuts may require cutting from the edge and be such that the laser beam cannot reach all the elements of the cut on its return along the same cutting path. In another advantageous development of the invention, therefore, the laser beam is guided in a first direction over a first cutting path and a second direction over a second cutting path. According to this construction, for example, the cut into the material may be effected along the first cutting path while the return of the laser beam and the second part of the cut are effected along the second cutting path. At the same time, both cutting paths or their center lines are preferably arranged in a V shape.

An apparatus according to the invention for performing the method comprises two serially disposed pivotable mirrors which can deflect the laser beam by pivoting, a first mirror deflecting the beam in a first direction toward a second mirror, and the second mirror deflecting the beam in a second direction toward the material to be cut. In an alternative embodiment the laser beam generated by a laser source meets the first pivotable mirror, and as a result, is deflected in a first direction. The second mirror is disposed to intercept the deflected beam either indirectly from the first mirror or directly after the first mirror has been pivoted out of the path of the rays. Pivoting of the second mirror causes the laser beam to be deflected in a second direction. Other optical elements may be disposed before, after and between the two mirrors but are not necessary to embody the apparatus according to the invention in its simplest form.

One of the main advantages of the apparatus according to the invention, as in the case of the method according to the invention, is that the laser beam is deflected only along a straight line or successively along different straight lines, and this is effected simply by pivoting a mirror about its pivot axis. The adjusting system for the beam deflection can thus be made very simple. Despite the fact that the beam deflection is only one-dimensional, a two-dimensional shaped cut can be produced. Another important advantage of the apparatus according to the invention is that two mirrors are provided for the two directions of the beam deflection, each providing deflection in just one direction. This is an advantage particularly when pointed cuts are to be made from the edge of the material, because in such cases there must be a rapid change of direction of the beam. There are limits to rapid reversal of the direction of pivoting of a mirror because of the masses requiring to be decelerated and accelerated. These difficulties are obviated in the apparatus according to the invention by using the second mirror for the beam return. Since movement of each mirror deflects the beam in a different direction, it is not necessary to accelerate and decelerate a single mirror to achieve the rapid change in direction of beam movement. On the changeover of the beam deflection function from the first mirror to the second mirror the two mirrors may be in motion simultaneously. At all events, the change of direction of the beam is effected more rapidly than would otherwise be possible with the same adjusting forces.

If only one cutting path needs to be covered in both directions, the invention advantageously provides for the pivot axes of the first mirror and of the second mirror to extend in parallel relationship and for the second direction to be opposite to the first direction.

If cutting is carried out along two cutting paths, the pivot axes of the first mirror and of the second mirror enclose an angle corresponding to the angle between the two different cutting paths and the laser beam is directed on to the second mirror via one or more deflecting mirrors disposed in front of the second mirror as considered in the direction of travel of the beam. In this construction as well, the deflection in a first direction is effected by the first mirror which then guides the beam onto a deflecting mirror or mirrors or else allows the beam to pass directly onto such mirrors, from which it then reaches the second mirror, which effects the deflection in the second direction along the second cutting path. In a very simple construction of this apparatus, the pivot axes are parallel to the cutting plane and enclose the same angle as the cutting paths. In another advantageous development, the first mirror can be pivoted out of the laser beam so that the laser beam reaches the deflecting mirror or mirrors directly. Alternatively, the beam can be allowed to pass to the deflecting mirrors by the pivoting of an otherwise rigid mirror.

In another advantageous development of the invention, the pivoting movement of each mirror is controllable to a program according to the required cut. The programming of the speed control of the beam deflection enables a change to be made from one shaped cut to another by changing the program or appropriate information support.

To concentrate the laser beam on the cutting path, it is advantageous, depending upon the construction of the apparatus, for one or both mirrors to have concentrating properties.

The edge sharpness of the shaped cut produced can be improved by a slotted mask between the mirrors and the material being cut, the slot or slots being disposed in the pivoting plane or planes of the beam. By inclining the sides of the slot or slots at least some of the radiation incident upon the flanks is reflected onto the material being cut, thereby enabling the slotted mask to concentrate the laser beam energy onto the cutting path. As a result of this construction, even a laser beam which has not been accurately focussed will not result in the focal point being enlarged with the energy of the masked part of the laser beam being lost. This construction of the mask may even render optical focussing systems superfluous. The width of the slot of the slotted mask is advantageously less than 0.5 mm.

BRIEF DESCRIPTION OF THE DRAWINGS

Exemplified embodiments of the invention are illustrated in the drawings and will be explained in detail hereinafter.

DETAILED DESCRIPTION OF PREFERRED EMBODIMENT

Figure 1:
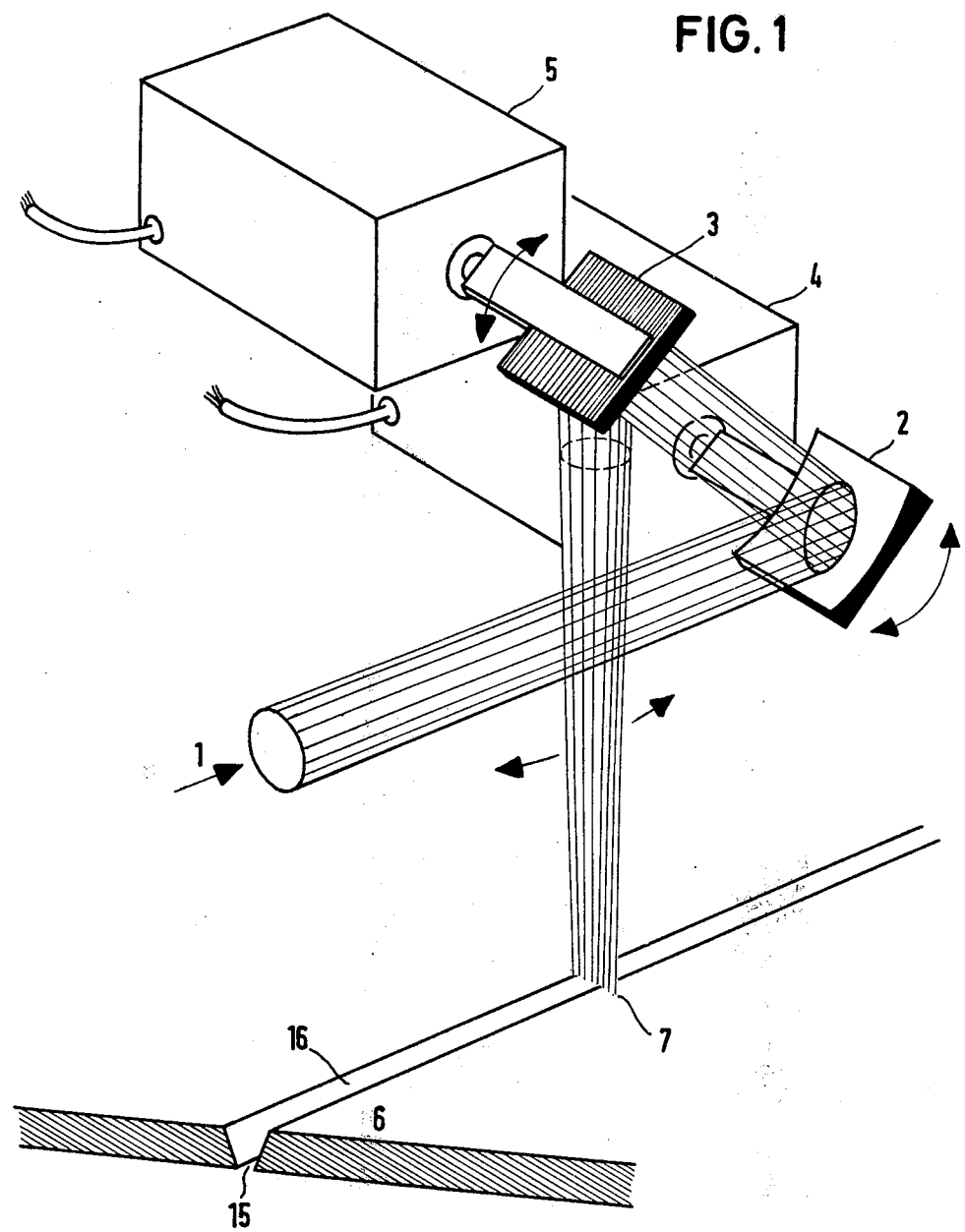
FIG. 1 is a perspective view of a first embodiment of an apparatus according to the invention and FIG. 2 is a perspective view of a second embodiment of an apparatus according to the invention.

In the first embodiment shown in FIG. 1, the laser beam 1 is guided on a single cutting path in both directions. The apparatus comprises a first mirror 2, which the laser beam 1 first meets. A second mirror 3 is disposed so as to deflect the beam 1 onto the material (not shown) being cut, after said beam has been first deflected by first mirror 2. Each mirror is secured to a shaft of an adjusting drive device 4, 5 respectively so as to be pivoted thereby. The pivot axes of the two adjusting drives and hence of the two mirrors are parallel to one another and to the plane of the material being cut. The adjusting drives are controlled by a control unit (not shown). The first mirror 2 is concave and hence concentrates the laser beam, while the second mirror 3 is a plane mirror.

A mask 6 containing a straight slot 15 is disposed immediately above the material being cut, the slot 15 being in the plane of travel of the laser beam. The sides 16 of the slot are so inclined as to give a V-section open at the top.

The method according to the invention is performed as follows with the apparatus shown in FIG. 1. A web of material, for example, is moved at constant speed below the stationary mask. The mirror 2 and the mirror 3 are so aligned as to direct onto the edge of the web of material a laser beam striking the mirror 2. As soon as the place on the edge of the web of material where cutting to shape is to start is situated beneath the slot 15, the laser beam source produces a laser beam whose cutting point 7 starts the cutting operation. The mirror 2 is then pivoted in the clockwise direction so that the cutting point 7 moves over the slot 15. The second mirror 3 is stationary in these conditions. Alternatively, the mirror 2 may start its pivoting movement before the starting point for the cutting to shape operation reaches the slot 15. In that case the mirror 2 would previously have to be in a position in which the laser beam is not yet directed onto the edge of the web of material.

The mirror 2 is pivoted at a variable speed adapted to the cut to be made. The speed of the beam in the cutting path is zero for those parts of the cut which extend in a direction parallel to the movement of the material. The speed of the beam in the cutting path is equal to $v/\cos \alpha$ in those parts which extend transversely of the direction of movement of the material where v denotes the speed of the web of material and $\alpha$ the angle between the cutting path and the direction of movement of the web of material. Those parts of the cut which extend between the aforementioned directions require a beam speed between 0 and $v/\cos \alpha$. Those parts of the cut which extend forwardly in the direction of movement of the material require a beam speed higher than $v/\cos \alpha$, although in the extreme case only an inclination $\alpha$ is possible to the direction of movement.

Just before the cutting point reaches its innermost point in the web of material, braking of the first mirror 2 is initiated if it is not already stationary. At the same time pivoting of the second mirror 3 is started, again in the clockwise direction (referred to FIG. 1). This initiates the return movement of the laser beam. When the first mirror has stopped, further deflection of the laser beam is produced only by the second mirror. The speed of pivoting of this latter mirror is also controlled according to the required cut. During the return movement of the laser beam it is not possible to make any cut whose inclination to the direction of movement of the material is greater than the angle $\alpha$. As soon as the cutting point reaches the edge of the web of material again, the laser beam source is switched off and the two mirrors are swung back into their starting position.

The beams meeting the inclined sides 16 of the slot 15 are at least partially reflected onto the cutting path during the entire cutting operation.

The same apparatus may also be operated as follows: The second mirror effects the first movement of the laser beam by the mirror being pivoted in the anticlockwise direction, whereupon the first mirror 2 is pivoted in the anticlockwise direction to return the laser beam to the edge of the material.

An identical apparatus may be disposed at the opposite edge of the web of material to perform the same or a different required cut.

Finally, the entire apparatus according to FIG. 1 including the masks above the web of material may be constructed to be rotatable about an axis perpendicular to the web of material to enable the inclination of the slot and the cutting path to be adapted to the required cut.

Figure 2:
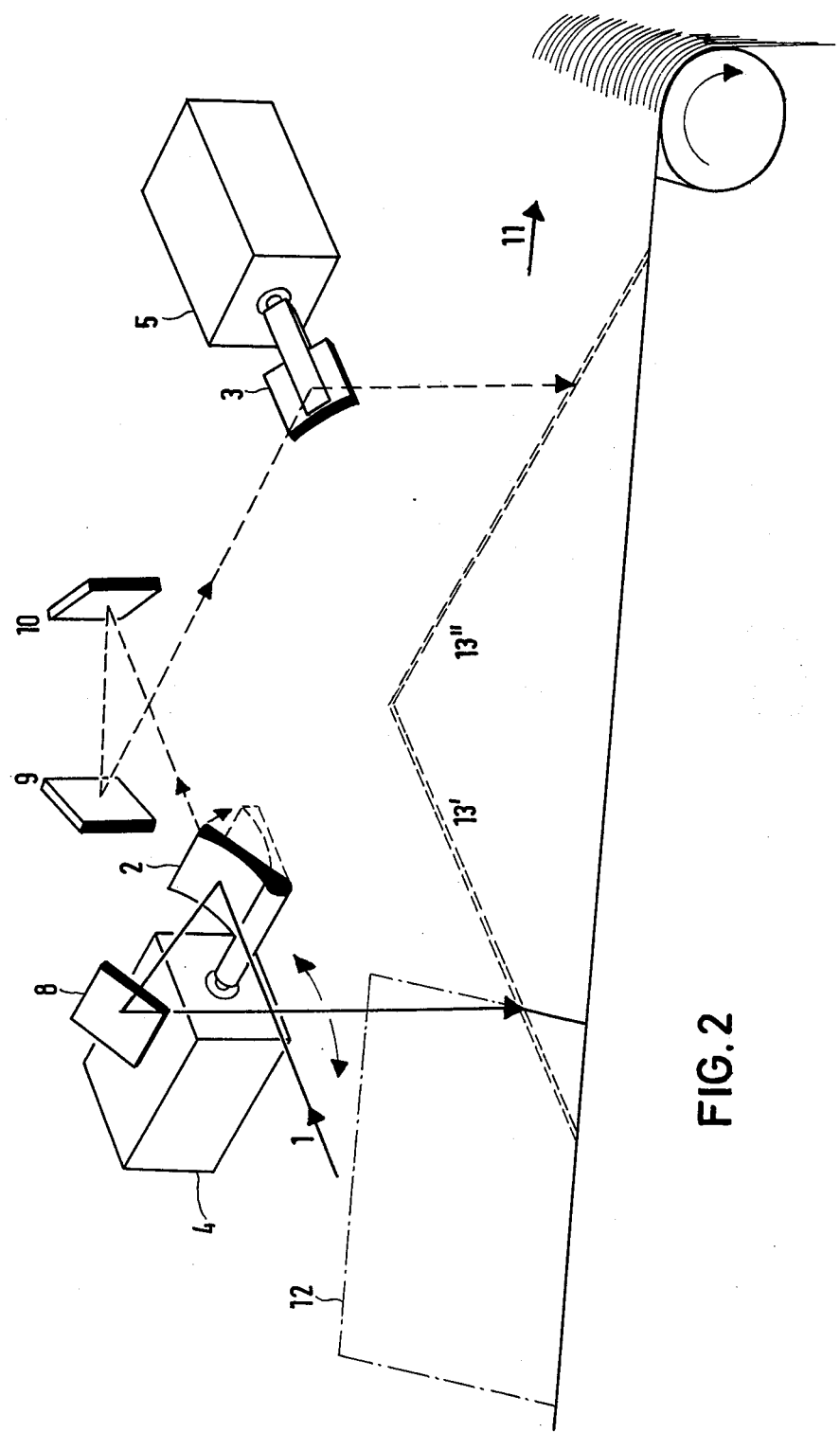

FIG. 2 shows a second embodiment of the apparatus according to the invention, like references denoting like parts of the apparatus according to FIG. 1. The laser beam 1 passes from the first mirror on to a rigid mirror 8 which deflects the laser beam on to a first cutting path 13'. The cutting paths 13' and 13'' represent paths the deflected laser beam would take if the web of material were not moving in direction 11. By adjusting the speed of the beam deflection with the speed of movement of the material to be cut, any desired shape may be cut. The first mirror 2 is pivoted for the starting cut with a speed control in the same manner as has been explained in connection with FIG. 1. By means of this pivoting movement it is possible, for example, to cut the right-hand and the rear part of a required cut 12 shown in chain lines in FIG. 2. As soon as the left-hand corner of the required cut has been reached in the example illustrated, the first mirror 2 is pivoted out of the laser beam so that the latter meets two deflecting mirrors which deflect it to the second mirror 3 which then effects the return of the laser beam along a second cutting path 13'', to cut the left-hand part of the required cut.

The pivot axis of the second mirror 3, like that of the first mirror, is parallel to the cutting plane, which is identical to the plane of the material web, but encloses with the pivot axis of the first mirror an angle which is equal to the angle between the first cutting path 13' and the second cutting path 13''. The required cut is completed by pivoting the second mirror at a controlled speed. Since the second cutting path is not identical to the first, a relatively large variety of shapes is possible even on the return of the laser beam. Using the apparatus shown in FIG. 2, on the return movement of the laser beam it is possible to cut elements which extend transversely of the direction of movement 11 of the web of material and also those elements which extend at an angle forwardly in the direction of movement of the web of material, the limit being defined by an angle between the direction of movement and the second cutting path.

Alternatively, the arrangement of the first mirror and the rigid mirror 8 can be reversed, in which case the mirror 8 must be adapted to pivot out of the laser beam and the mirror 2 would be pivoted in the anticlockwise direction on the cutting operation.

An apparatus for two cutting paths 13' and 13'' can also be embodied without deflecting mirrors using just the two mirrors 2 and 3. In that case, the laser beam 1 would meet the first mirror 2 from the right (in FIG. 2) and said mirror 2 can guide the beam along the cutting path 13'. The second mirror 3 would be disposed above the point of intersection of the cutting paths 13' and 13'', the first mirror directing the laser beam on said second mirror 3 at the end of its pivoting movement. The second mirror 3, the projection of the pivot axis of which on to the web of material is perpendicular to the second cutting path 13'', is so secured to the shaft of the adjusting means 5 that it directs the laser beam arriving in the direction of the pivot axis downwardly on to the second cutting path 13''. The laser beam is moved along the second cutting path by pivoting the second mirror about its pivot axis.

In the case of an apparatus for two different straight cutting paths it is not necessary for the cutting paths to merge into one another. Instead, they may have some distance apart in the direction of the web and terminate before they intersect. Consequently, between the time at which the cut is completed on the first cutting path and the time at which the cut is continued on the second cutting path there is a time difference which is dependent upon the speed of the web of material and which is available for mechanical adjustment operations. This gives another important advantage of the embodiment for two cutting paths.

This time difference may be utilized as follows for example: When points are being cut which extend laterally into the web of material, the beam may be moved at a suitable speed beyond the end of the first cutting path and then the first mirror is brought into the position in which the second mirror is irradiated by the laser beam, the second mirror is accelerated, and the laser beam begins the cut on the second cutting path at a suitable beam speed only after the time difference has elapsed. The time difference may be made such that adequate time is available for the change-over operations described, so that the mechanical inertia of some of the elements of the apparatus does not result in any limitation as regards the shape of the required cut.

What is claimed is:

1. A method of cutting a predetermined pattern from a moving web of material, such as paper, cardboard or the like, comprising the steps of:
   a. generating a laser beam from a laser beam source and directing said beam in a first direction onto a first pivotable mirror;
   b. deflecting said laser beam in a second direction by said first pivotable mirror, onto a second pivotable mirror;
   c. deflecting said laser beam onto the moving web of material by said second pivotable mirror;
   d. passing the laser beam through a slot in a mask immediately prior to its contacting the moving web of material;
   e. pivoting said first pivotable mirror to cause said laser beam to travel in a first direction so as to cut through said web along a given path in said moving web of material; and
   f. pivoting said second pivotable mirror to cause said laser beam to travel in a second direction so as to cut through said web along said given path in said moving web of material, wherein the first and second mirrors are pivoted about axes which are parallel to each other and to the plane of travel of said moving web of material.

2. The method of claim 1 wherein the laser beam is also focussed by the first movable mirror.

3. The method of claim 1 wherein the first and second pivotable mirrors are pivoted in the same direction.

4. A method of cutting a predetermined pattern from a moving web of material, such as paper, cardboard, or the like, comprising the steps of:

a. generating a laser beam from a laser beam source and directing said beam in a first direction onto a first pivotable mirror;
b. deflecting said laser beam in a second direction by said first pivotable mirror onto a first stationary mirror;
c. deflecting said laser beam onto said moving web of material by said first stationary mirror;
d. pivoting said first pivotable mirror so as to cause said laser beam to move and cut through the web along a first predetermined path on said moving web of material;
e. pivoting said first pivotable mirror out of the direction of travel of said laser beam when said beam reaches a predetermined point on the web of material;
f. directing said laser beam in a third direction onto a second pivotable mirror;
g. deflecting said laser beam onto said moving web of material by said second pivotable mirror; and
h. pivoting said second pivotable mirror so as to cause said laser beam to move and cut through the web along a second predetermined path on said moving web of material.

5. The method of claim 4 wherein the first and second pivotable mirrors are pivoted about axes which are coplaner and non-parallel, the plane being parallel to the plane of travel of the moving web of material.

6. The method of claim 4 wherein the laser beam is directed in a third direction onto the second pivotable mirror by deflecting said beam by second and third stationary mirrors.

7. The method of claim 4 comprising the further step of passing the laser beam through a slot in a mask immediately prior to its contacting the moving web of material.

8. The method of claim 4 wherein the laser beam is focussed by said first and second pivotable mirrors.

* * * * *